US011341407B2

(12) United States Patent
Peterson et al.

(10) Patent No.: US 11,341,407 B2
(45) Date of Patent: May 24, 2022

(54) SELECTING A DISCONNECT FROM DIFFERENT TYPES OF CHANNEL DISCONNECTS BY TRAINING A MACHINE LEARNING MODULE

(71) Applicant: INTERNATIONAL BUSINESS MACHINES CORPORATION, Armonk, NY (US)

(72) Inventors: Beth A. Peterson, Tucson, AZ (US); Lokesh M. Gupta, Tucson, AZ (US); Matthew R. Craig, Sahuarita, AZ (US); Kevin J. Ash, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 754 days.

(21) Appl. No.: 16/270,453

(22) Filed: Feb. 7, 2019

(65) Prior Publication Data
US 2020/0257967 A1    Aug. 13, 2020

(51) Int. Cl.
*G06N 3/08*      (2006.01)
*G06F 13/20*     (2006.01)
(Continued)

(52) U.S. Cl.
CPC ............. *G06N 3/08* (2013.01); *G06F 13/126* (2013.01); *G06F 13/20* (2013.01); *G06N 20/00* (2019.01)

(58) Field of Classification Search
CPC .................................................... G06F 3/0659
See application file for complete search history.

(56) References Cited

U.S. PATENT DOCUMENTS 3,906,452 A  *  9/1975  Moder ............... H04L 12/52
                                                            710/104
5,452,402 A     9/1995  Sakiyama et al.
(Continued)

FOREIGN PATENT DOCUMENTS

CN       104239194       12/2014

OTHER PUBLICATIONS

Notice of Allowance 1 for U.S. Appl. No. 16/270,464, 9 pp, dated Oct. 21, 2020. [18.853 (NOA1)].
(Continued)

*Primary Examiner* — Henry Tsai
*Assistant Examiner* — Juanita Borromeo
(74) *Attorney, Agent, or Firm* — Konrad Raynes Davda & Victor LLP; Janaki K. Davda

(57) ABSTRACT

Provided are techniques for selecting a disconnect by training a machine learning module. A machine learning module is provided that receives inputs and produces an output. The output produced from the machine learning module based on the inputs for the first I/O operation and an estimated amount of time to acquire resources for a first I/O operation is determined. An actual amount of time to acquire resources for the first I/O operation is determined. The machine learning module is retrained based on the inputs, the output, and the actual amount of time it took to acquire resources for the first I/O operation versus an estimated amount of time to acquire the resources for the first I/O operation. The retrained machine learning module is used to select one of disconnect from a channel, the logical disconnect from the channel, or the physical disconnect from the channel for a second I/O operation.

18 Claims, 11 Drawing Sheets

(51) Int. Cl.
    *G06N 20/00*    (2019.01)
    *G06F 13/12*    (2006.01)

(56)        References Cited

U.S. PATENT DOCUMENTS 8,185,909 B2       5/2012   Sigal et al.
    2007/0022142 A1    1/2007   Palmer et al.
    2020/0073834 A1    3/2020   Hagdahl et al.

OTHER PUBLICATIONS

Abstract and Machine Translation for CN Publication No. 104239194, dated Dec. 24, 2014, 7 pp.
U.S. Appl. No. 16/270,464, filed Feb. 7, 2019, for (18.853), 37 pp.
List of IBM Patents or Patent Applications Treated as Related, Feb. 7, 2019, 2 pp. [18.828 (Appendix P)].
Office Action 1 for U.S. Appl. No. 16/270,464, 11 pp, dated Apr. 7, 2020. [18.853 (OA1)].
Response to Office Action 1 for U.S. Appl. No. 16/270,464, 12 pp, dated Jul. 7, 2020. [18.853 (ROA1)].

* cited by examiner

SELECTING A DISCONNECT FROM DIFFERENT TYPES OF CHANNEL DISCONNECTS BY TRAINING A MACHINE LEARNING MODULE

BACKGROUND

1. Field of the Invention

Embodiments of the invention relate to selecting a disconnect from different types of channel disconnects by training a machine learning module. In particular, embodiments of the invention relate to a storage controller selecting a disconnect from different types of channel disconnects with reference to a channel that connects a host to the storage controller by training a machine learning module.

2. Description of the Related Art

In certain storage system environments, a storage controller (or a storage controller complex) may comprise a plurality of storage servers that are coupled to each other. The storage controller allows host computing systems to perform Input/Output (I/O) operations with storage devices controlled by the storage controller, where the host computing systems may be referred to as hosts. A plurality of such storage controllers, hosts, and other computational devices may be deployed at one or more sites to provide an environment for storage and management of data and also to provide an environment for data processing and recovery.

A channel connects the storage controller to a host, and the host may issue an I/O operation to the storage controller over the channel. The channel may be based upon a particular host attachment protocol, such as Fibre Connection (FICON).

When an I/O operation comes into the storage controller via the channel from the host, the storage controller may not know how long it will take to acquire resources to be able to process the I/O operation. While the storage controller 120 is acquiring resources for the I/O operation, the storage controller determines whether to disconnect from the host, perform a logical disconnect or perform a physical disconnect.

For example, the storage controller may determine not to disconnect from the channel when acquiring the resources ("I/O setup") will take a small amount of time (e.g., under 10 milliseconds (ms).

The storage controller may determine to perform a logical disconnect when acquiring the resources will take longer but not very long (e.g., I/O setup will take between 10 to 500 ms). The I/O port logically disconnects from the host channel, for example, due to a cache miss (i.e., data is not available in the cache, and the exchange remains open). Data transfers for other I/O operations in progress may be multiplexed over the I/O interface until the cache miss is resolved. FICON channels run on Fibre channel protocols that support frame multiplexing. I/O operations for different logical devices may be interleaved on the I/O interface without disconnection. On FICON channels, the channel closes the exchange when channel end status is presented without device end. The overhead of establishing a new exchange on reconnection may be significant to overall performance and is avoided by logically disconnecting without presenting status.

The storage controller may determine to perform a physical disconnect when acquiring the resources will take longer than a threshold (e.g., 500 ms). In this case, the channel closes the exchange completely. When the storage controller is ready to respond to the host, a new reconnection is established. The overhead of establishing a new exchange may be costly.

In conventional systems, the storage controller takes a best guess on which option to choose for an I/O operation.

SUMMARY

Provided is a computer program product for selecting a disconnect from different types of channel disconnects by training a machine learning module. The computer program product comprises a computer readable storage medium having program code embodied therewith, the program code executable by at least one processor to perform operations. A machine learning module is provided that receives inputs and produces an output that is used to select one of no disconnect from a channel, a logical disconnect from the channel, or a physical disconnect from the channel for a first Input/Output (I/O) operation. The output produced from the machine learning module is determined based on the inputs for the first I/O operation and an estimated amount of time to acquire resources for the first I/O operation. An actual amount of time to acquire resources for the first I/O operation is determined. The machine learning module is retrained based on the inputs, the output, and the actual amount of time it took to acquire resources for the first I/O operation versus an estimated amount of time to acquire the resources for the first I/O operation. The retrained machine learning module is used to select one of no disconnect from the channel, the logical disconnect from the channel, or the physical disconnect from the channel for a second I/O operation.

Provided is a computer system for selecting a disconnect from different types of channel disconnects by training a machine learning module. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. A machine learning module is provided that receives inputs and produces an output that is used to select one of no disconnect from a channel, a logical disconnect from the channel, or a physical disconnect from the channel for a first Input/Output (I/O) operation. The output produced from the machine learning module is determined based on the inputs for the first I/O operation and an estimated amount of time to acquire resources for the first I/O operation. An actual amount of time to acquire resources for the first I/O operation is determined. The machine learning module is retrained based on the inputs, the output, and the actual amount of time it took to acquire resources for the first I/O operation versus an estimated amount of time to acquire the resources for the first I/O operation. The retrained machine learning module is used to select one of no disconnect from the channel, the logical disconnect from the channel, or the physical disconnect from the channel for a second I/O operation.

Provided is a computer-implemented method for selecting a disconnect from different types of channel disconnects by training a machine learning module. The computer-implemented method comprises operations. A machine learning module is provided that receives inputs and produces an output that is used to select one of no disconnect from a channel, a logical disconnect from the channel, or a physical disconnect from the channel for a first Input/Output (I/O) operation. The output produced from the machine learning module is determined based on the inputs for the first I/O operation and an estimated amount of time to acquire resources for the first I/O operation. An actual amount of time to acquire resources for the first I/O operation is determined. The machine learning module is retrained based on the inputs, the output, and the actual amount of time it took to acquire resources for the first I/O operation versus an estimated amount of time to acquire the resources for the first I/O operation. The retrained machine learning module is used to select one of no disconnect from the channel, the logical disconnect from the channel, or the physical disconnect from the channel for a second I/O operation.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments use a machine learning module (e.g., neural network) to enable the storage controller to more accurately determine whether to disconnect, perform a logical disconnect or perform a physical disconnect.

Figure 1:
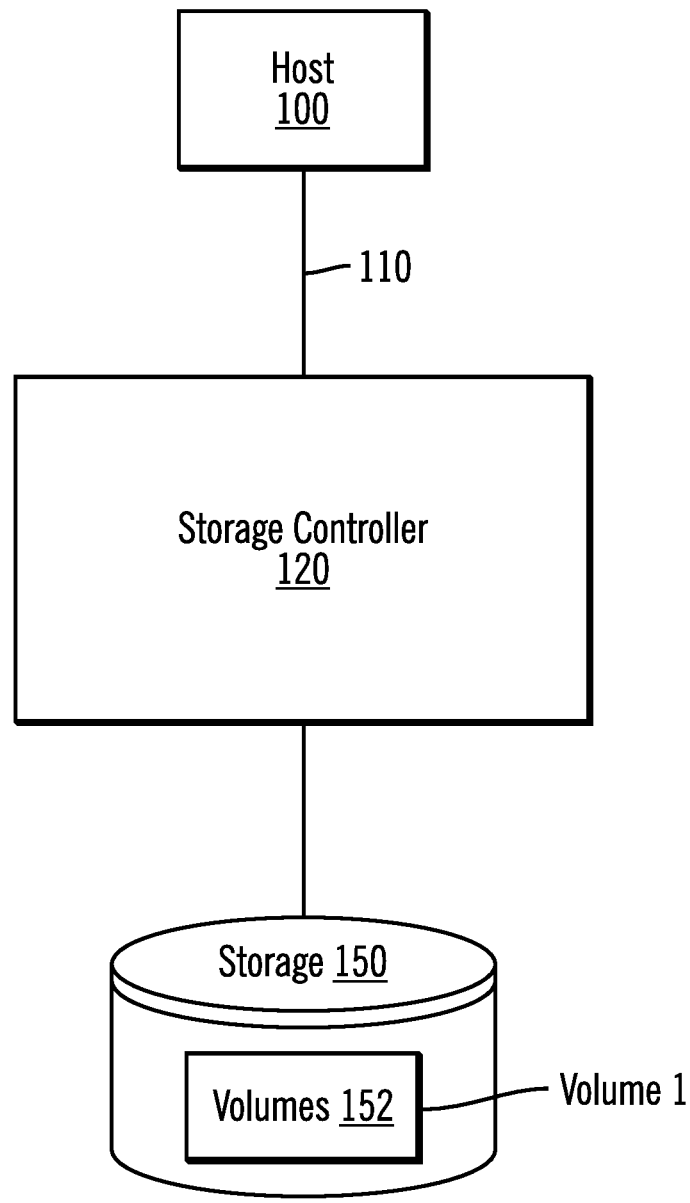
FIG. 1 illustrates, in a block diagram, a computing environment with a storage controller in accordance with certain embodiments.

FIG. 1 illustrates, in a block diagram, a computing environment with a storage controller in accordance with certain embodiments. At least one host 100 is coupled, via a channel 110, to a storage controller 120. The host 100 may submit Input/Output (I/O) operation requests to the storage controller (or storage control units) 120 over the channel 110 to access data at volumes 152 in storage 150. The volumes may be, for example, Logical Unit Numbers, Logical Devices, Logical Subsystems, etc. The storage 150 may be storage drives. With embodiments, the volumes are CKD volumes.

In certain embodiments, the channel is based upon a particular host attachment protocol, such as Fibre Connection (FICON), for example.

Communication software associated with the channel 110 includes instructions and other software controlling communication protocols and the operation of the communication hardware in accordance with the communication protocols, if any. It is appreciated that other channel protocols may be utilized, depending upon the particular application.

Furthermore, as used herein, the term "unit of storage" or "storage unit" refers to a storage location containing one or more units of data storage capable of storing one or more data units such as one or more volumes, cylinders, tracks, segments, extents, or any portion thereof, or other unit or units of data suitable for transfer.

Figure 2:
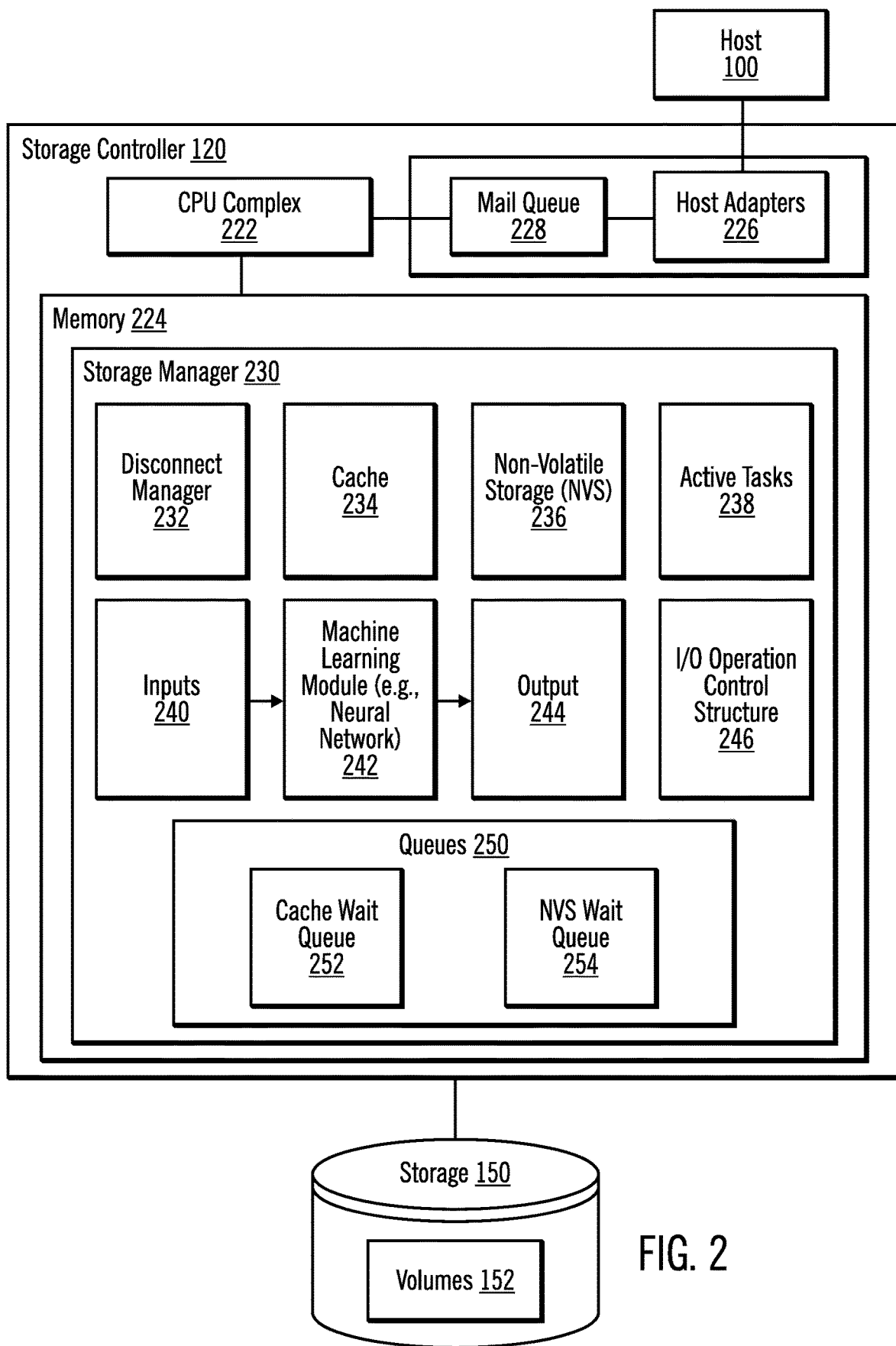
FIG. 2 illustrates, in a block diagram, further details of a storage controller in accordance with certain embodiments.

FIG. 2 illustrates, in a block diagram, further details of a storage controller 120 in accordance with certain embodiments. The storage controller 120 includes a Central Processing Unit (CPU) complex 222, including one or more processors or central processing units, each having a single or multiple processor cores. In certain embodiments, a processor core contains the components of a CPU involved in executing instructions, such as an Arithmetic Logic Unit (ALU), Floating Point Unit (FPU), and/or various levels of cache (such as L1 and L2 cache), for example. It is appreciated that a processor core may have other logic elements in addition to or instead of those mentioned herein.

The storage controller 120 communicates with the host 100 thru host adapters 226. The CPU complex 222 communicates with the host adapters 226 thru a bus and by using a mail queue 228.

Also, the storage controller 120 includes a memory 224. The CPU complex 222 is connected to the memory 224.

The memory 224 includes a storage manager 230 for managing storage operations (e.g., to store data in the storage 150 or retrieve data from the storage 150). The storage manager 230 includes a disconnect manager 232, a cache 234, non-volatile storage (NVS) 236, and active tasks 238. The storage manager 230 also includes inputs 240, a machine learning module 242 (e.g., a neural network), and an output 244. The storage manager 230 includes an I/O operation control structure 246 and queues 250. The queues 250 include a cache wait queue 252 and an NVS queue 254.

With embodiments, the storage manager 230, including the disconnect manager 232, is depicted as software stored in the memory 224 and executed by the CPU complex 222. However, it is appreciated that the logic functions of the storage manager 230 may be implemented as hardware, software, firmware or combinations of one or more thereof, depending upon the particular application.

The machine learning module 242 implements a machine learning technique such as decision tree learning, association rule learning, artificial neural network, inductive programming logic, support vector machines, Bayesian models, etc., to determine the output value 244.

In certain machine learning module 242 implementations, weights in a hidden layer of nodes may be assigned to these inputs to indicate their predictive quality in relation to other of the inputs based on training to reach the output value 244.

The machine learning module 242 may be trained using backward propagation to adjust weights at nodes in a hidden layer to produce adjusted output values based on the provided inputs 240. A margin of error may be determined with respect to the actual output 244 from the machine learning module 224 and an expected output to train the machine learning module 242 to produce the desired output value based on a calculated expected output. In backward propagation, the margin of error of the output may be measured and the weights at nodes in the hidden layer may be adjusted accordingly to decrease the error.

Backward propagation may comprise a technique for supervised learning of artificial neural networks using gradient descent. Given an artificial neural network and an error function, the technique may calculate the gradient of the error function with respect to the artificial neural network's weights.

The storage 150 may include volumes storing tracks. Tracks in volumes 152 may be stored in cache 234 for fast access. As used herein, the term track may refer to a track of a disk storage unit, but may also reference to other units of data (or data units) configured in the storage 150 such as a bit, byte, word, segment, page, block (such as a Logical Block Address (LBA)), etc., which may be a part of a larger grouping of data units, such as those stored collectively as a volume, logical device, etc. of data.

In certain embodiments, the storage 150 may be comprised of one or more sequential access storage devices, such as hard disk drives and magnetic tape or may include non-sequential access storage devices, such as Solid State Drives (SSDs), for example. The storage 150 may comprise a single sequential or non-sequential access storage device or may comprise an array of storage devices, such as a Just a Bunch of Disks (JBOD), Direct Access Storage Device (DASD), Redundant Array of Independent Disks (RAID) array, virtualization device, tape storage, flash memory, etc.

Figure 3:
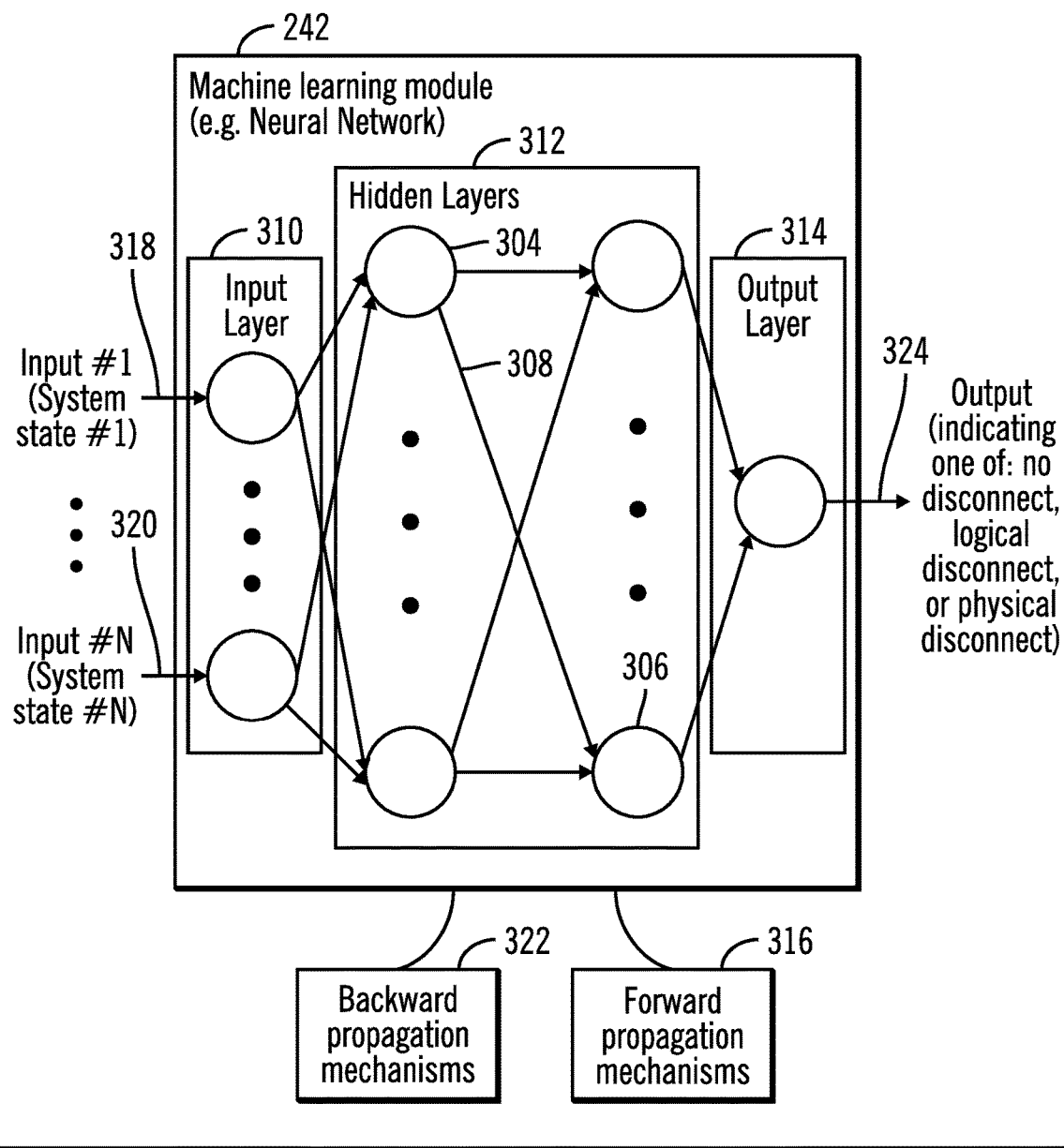
FIG. 3 illustrates, in a block diagram, details of a machine learning module for selecting a disconnect from different types of channel disconnects in accordance with certain embodiments.

FIG. 3 illustrates, in a block diagram, details of a machine learning module 242 for selecting a disconnect from different types of channel disconnects in accordance with certain embodiments.

The machine learning module 242 may comprise a neural network with a collection of nodes with links connecting them, where the links are referred to as connections. For example, FIG. 3 shows a node 304 connected by a connection 308 to the node 306. The collection of nodes may be organized into three main parts: an input layer 310, one or more hidden layers 312, and an output layer 314.

The connection between one node and another is represented by a number called a weight, where the weight may be either positive (if one node excites another) or negative (if one node suppresses or inhibits another). Training the machine learning module 242 entails calibrating the weights in the machine learning module 242 via mechanisms referred to as forward propagation 316 and backward propagation 322. Bias nodes that are not connected to any previous layer may also be maintained in the machine learning module 242. A bias may be described as an extra input of 1 with a weight attached to it for a node.

In certain embodiments, the input data 318 . . . 320 are examples of inputs 240, and output 324 is an example of output 244.

In forward propagation 316, a set of weights are applied to the input data 318 . . . 320 to calculate the output 324. For the first forward propagation, the set of weights may be selected randomly or set by, for example, a system administrator.

In backward propagation 322 a measurement is made for a margin of error of the output 324, and the weights are adjusted to decrease the error. Backward propagation 322 compares the output that the machine learning module 242 produces with the output that the machine learning module 242 was meant to produce, and uses the difference between them to modify the weights of the connections between the nodes of the machine learning module 242, starting from the output layer 314 through the hidden layers 312 to the input layer 310, i.e., going backward in the machine learning module 242. In time, backward propagation 322 causes the machine learning module 242 to learn, reducing the difference between actual and intended output to the point where the two come very close or coincide. Thus, the machine learning module 242 is configured to repeat both forward and backward propagation until the weights of the machine learning module 242 are calibrated to accurately predict an output.

Figure 4:
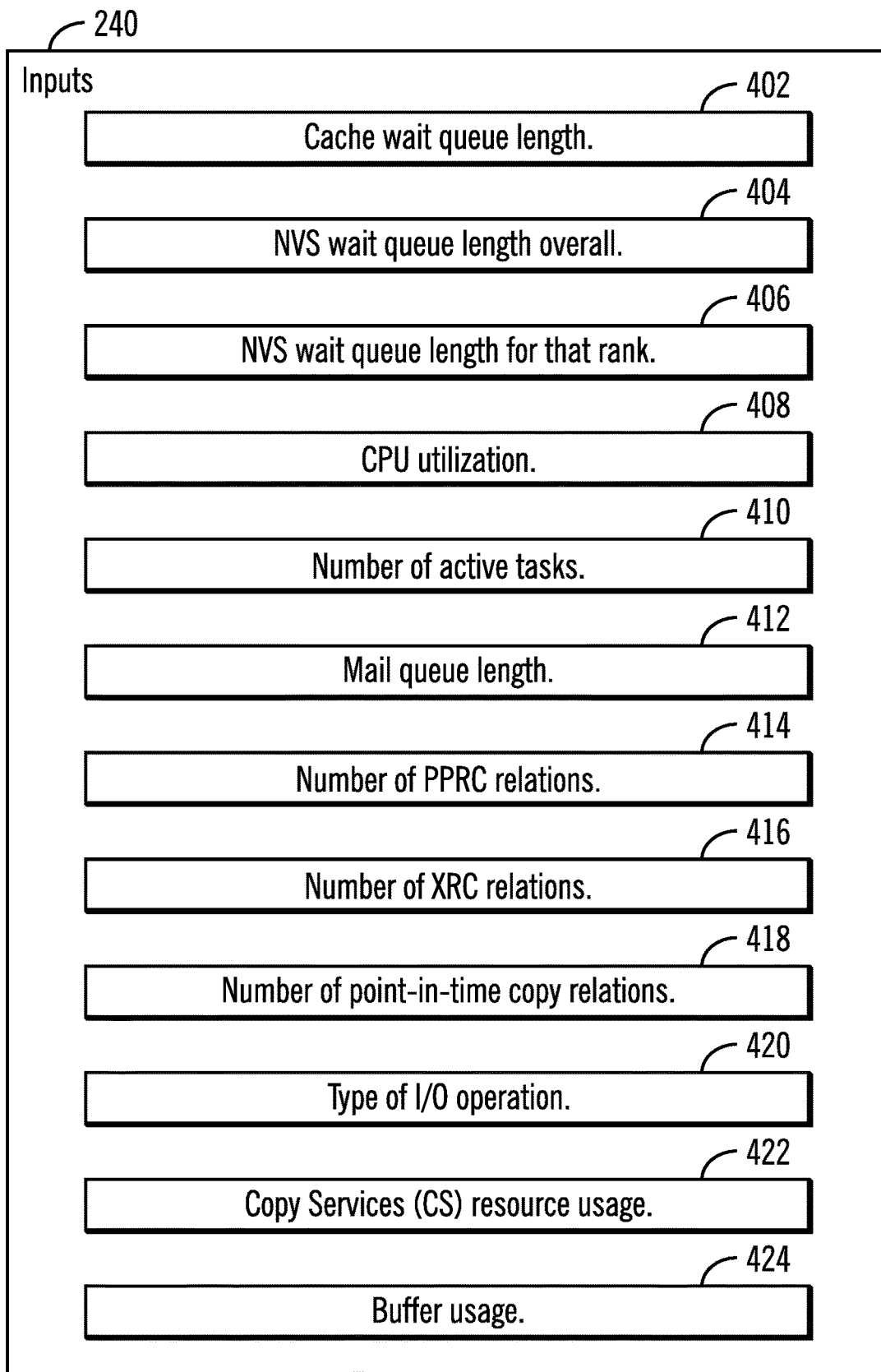
FIG. 4 illustrates, in a block diagram, exemplary inputs to the machine learning module, in accordance with certain embodiments.

FIG. 4 illustrates, in a block diagram, exemplary inputs 240 to the machine learning module 242, in accordance with certain embodiments.

A cache wait queue length 402 describes a length of the cache wait queue 252 that stores I/O operations waiting for cache segments. That is, the I/O operations are waiting for tracks that are not in the cache 234.

The NVS wait queue length overall 404 describes a length of the NVS wait queue 254 that stores I/O operations waiting for NVS segments. That is, the I/O operations are waiting for tracks that are not in the NVS 236.

For write operations, there are ranks. The NVS wait queue for that rank 406 describes the length of the NVS wait queue 254 for the rank to which an I/O operation belongs.

The CPU utilization 408 describes a range from 0%-100% and indicates how much the CPU complex 222 is being utilized. With embodiments, this is the current CPU utilization.

The number of active tasks 410 describes the number of active tasks 238 for I/O operations from the host that are executing at the storage controller 120. With embodiments, the active tasks 238 are Task Control Blocks (TCBs). The TCBs perform, for example, the operations to destage tracks from the cache 252 to the storage 150.

The mail queue length 412 describes a number of messages queued in the mail queue 228. Different components may communicate via the mail queue 228. For example, an active task 238 may leave a message in the mail queue 228 for a host adapter 226. In certain embodiments, the mail queue 228 stores the mail between the CPU complex 222 and the host adapters 226. In additional embodiments, there may be other mail queues within the storage controller 120.

The number of Peer-to-Peer Remote Copy (PPRC) relations 414 describes the number of this type of copy operation executing at the storage controller 120. Peer-to-Peer Remote Copy (PPRC) function supports the concept of a PPRC consistency group. Volumes in a PPRC relationship that are configured into a PPRC consistency group are maintained to ensure that a group of updates made to volumes at the primary system are also eventually made on the volumes at the secondary system to maintain data consistency for those volumes of the group. Accordingly, consistency groups may be formed between volumes of the primary system and the secondary system which are consistent with respect to a particular set of updates or a particular point in time, notwithstanding the overall asynchronous relationship between the primary system and the secondary system.

The number of Extended Remote Copy (XRC) relations describes a number of this type of copy operation executing at the storage controller 120. XRC provides an asynchronous remote copy solution.

The number of point-in-time copy relations 418 describes the number of this type of copy operation executing at the storage controller 120. A point-in-time copy function may be an IBM® FlashCopy® function, for example. (IBM and FlashCopy are registered trademarks or common law marks of International Business Machines Corporation in the United States and/or other countries.) The point-in-time copy function creates a "snapshot" of the contents of a source volume as of a particular point-in-time in a target volume which may be referred to as the point-in-time copy volume. One version of a point-in-time copy function transfers the contents of the source volume to the point-in-time copy volume in a background copy operation. The point-in-time copy function may also be referred to as a point-in-time snap copy function. A point-in-time copy may be described as a copy of the data consistent as of a particular point-in-time, and would not include updates to the data that occur after the point-in-time.

The type of I/O operation 420 indicates whether the I/O operation is a read operation, a write operation, a susbsytem operation or a miscellaneous (e.g., reading configuration data) operation.

The Copy Services (CS) resource usage 422 indicates resource usage by Copy Services (e.g., low, medium or high). Copy Services supports copying for the different types of relations. Copy Services may move data between storage controllers and/or storage volumes.

The buffer usage 424 describes an amount of the buffers used for I/O operations. The I/O operations may read data from the buffers or write data to the buffers.

For forward propagation, the machine learning module 242 takes the inputs 240 and generates the output 244. With embodiments, the values of the inputs 240 and the output 244 are saved in the I/O operation control structure 246 and used for backward propagation.

The machine learning module 242 is trained using backward propagation. In certain embodiments, the backward propagation may be done when an I/O operation completes or when a pre-determined number (N) I/O operations complete in the storage controller 120. At the completion of the Nth I/O operation, the machine learning module 242 is trained based on the actual amount of time it took to acquire resources in the storage controller 120 versus the value for the estimated amount of time to acquire the resources saved in the I/O operations control structure 246.

With embodiments, the margin of error is the estimated amount of time to acquire the resources (from the I/O operation control structure) minus the actual amount of time taken for acquiring the resources (e.g., estimated amount of time for acquiring resources—actual amount of time for acquiring resources). This margin of error, along with the input values saved in the I/O operations control structure 246, are backward propagated to adjust weights and margins in the machine learning module 242.

Figure 5:
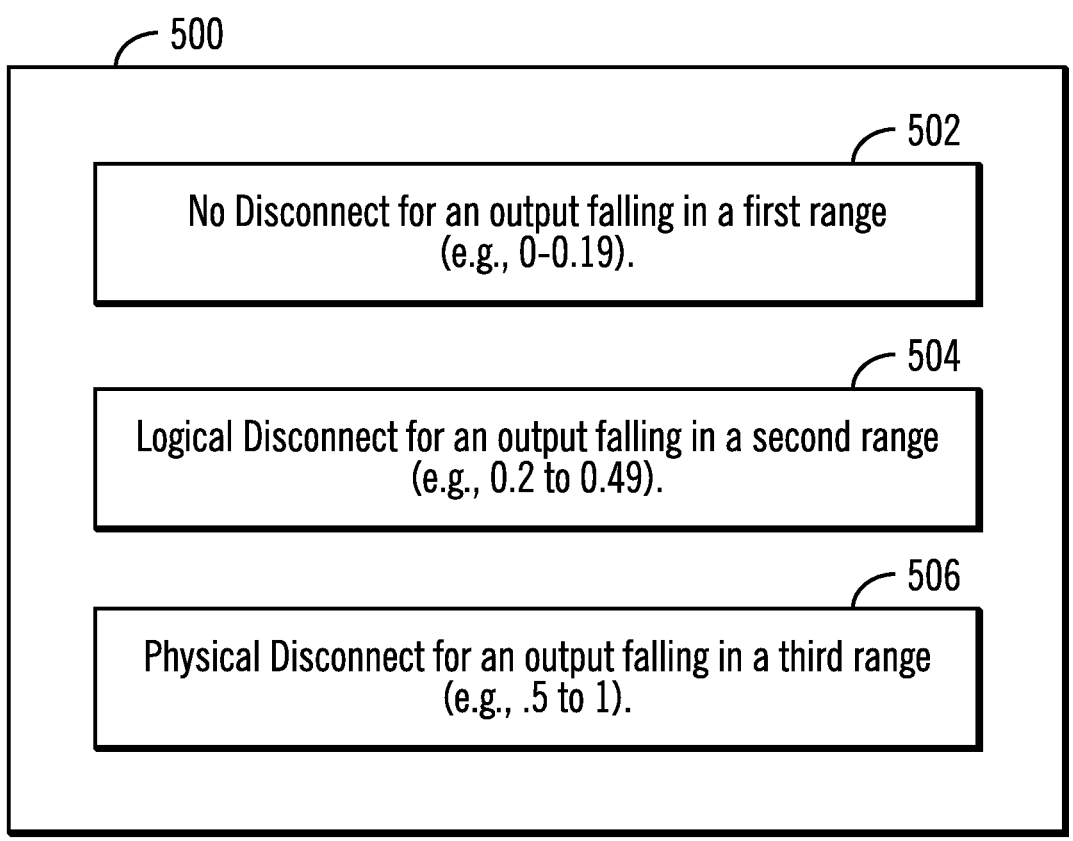
FIG. 5 illustrates, in a block diagram, how output, from the machine learning module, is mapped to one of no disconnect, logical disconnect, or physical disconnect in accordance with certain embodiments.

FIG. 5 illustrates, in a block diagram, mappings 500 to show how output 244, from the machine learning module 242, is mapped to one of no disconnect, logical disconnect, or physical disconnect in accordance with certain embodiments. The machine learning module 242 may output a value in the range of 0 to 1. The disconnect manager 232 determines that there is to be no disconnect for an output 244 falling in a first range (e.g., 0 to 0.19). The disconnect manager 232 determines that there is to be a logical disconnect for an output falling in a second range (e.g., 0.2 to 0.49). The disconnect manager 232 determines that there is to be a physical disconnect for an output falling in a third range (e.g., 0.5 to 1).

Figure 6:
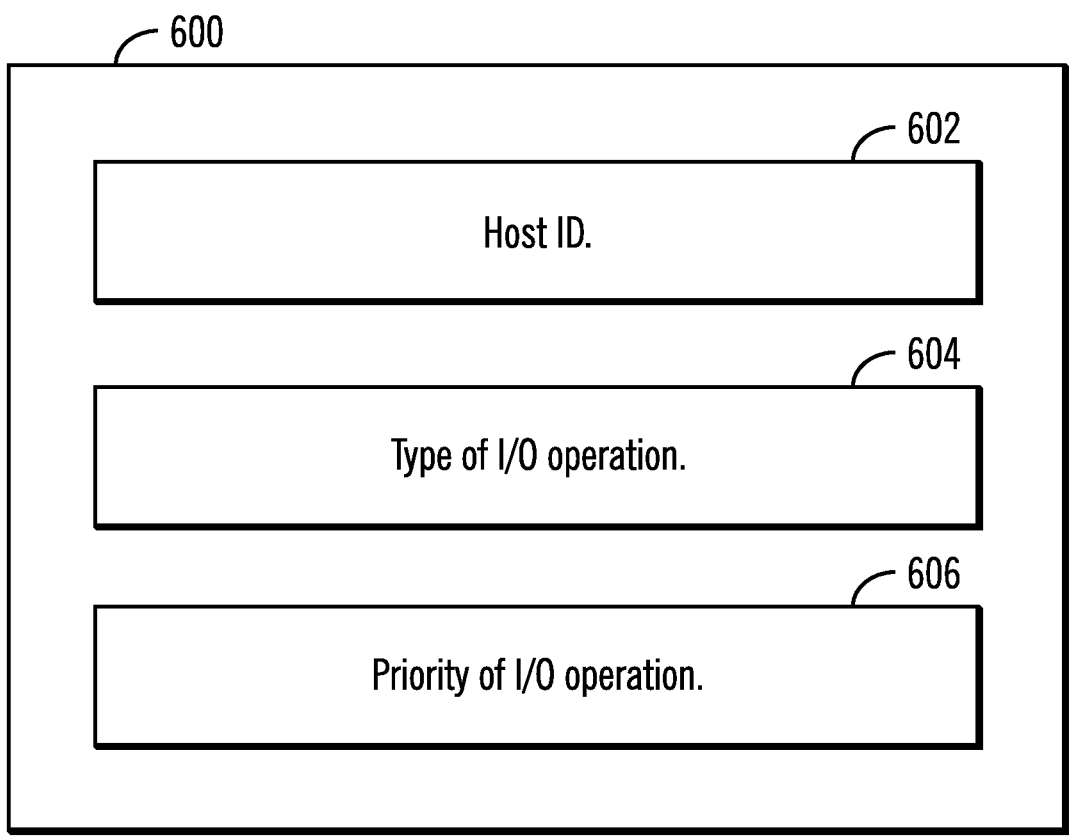
FIG. 6 illustrates an embodiment of a host request 600 in accordance with certain embodiments.

FIG. 6 illustrates an embodiment of a host request 600 in accordance with certain embodiments. The host request 600 may include a host ID 602; a type of I/O operation 604; and a priority of the I/O operation 606. With embodiments, the host request 600 may include other information.

Figure 7:
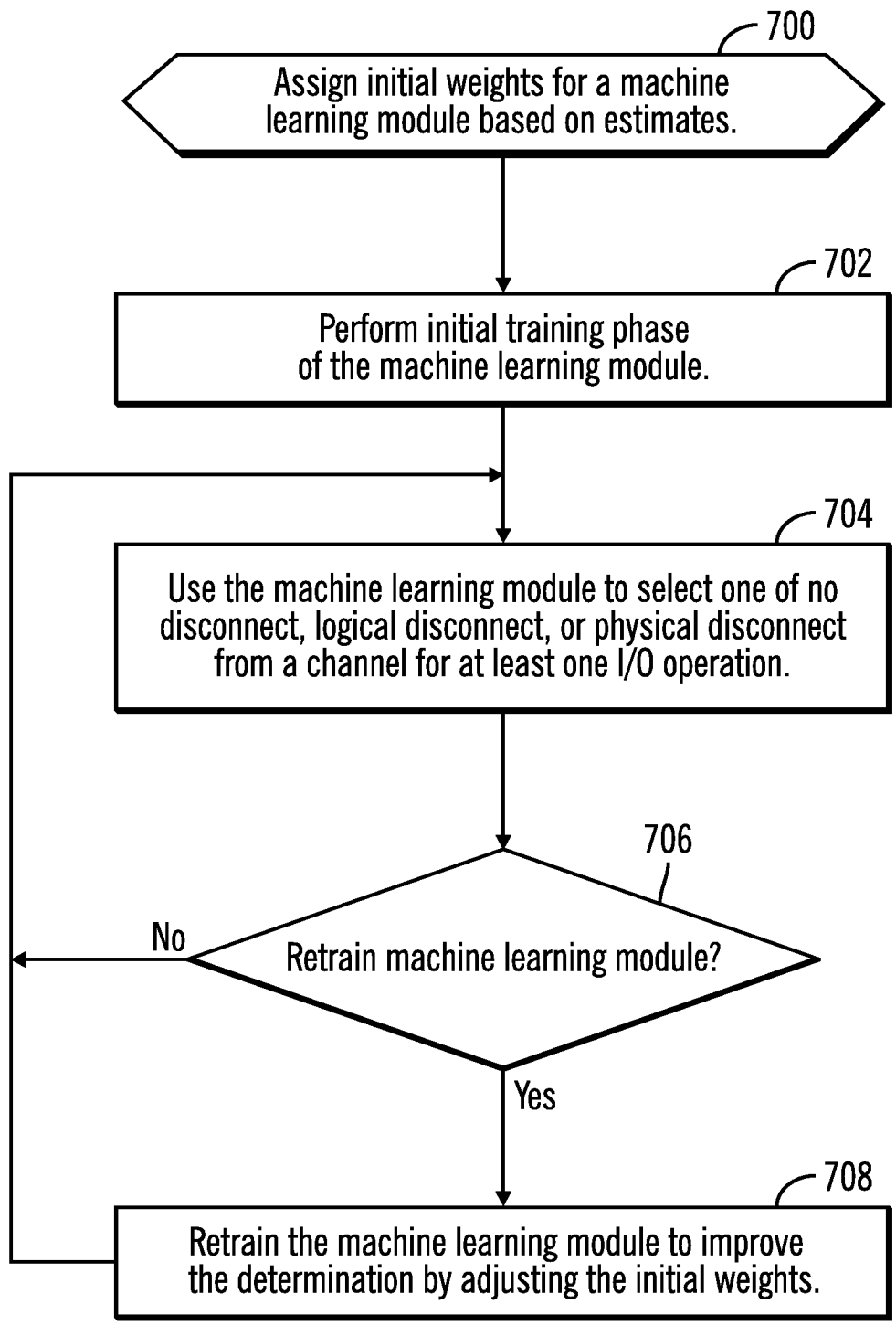
FIG. 7 illustrates, in a flowchart, operations for initializing, using, and training a machine learning module in accordance with certain embodiments.

FIG. 7 illustrates, in a flowchart, operations for initializing, using, and training a machine learning module in accordance with certain embodiments. Control begins at block 700 with assignment of initial weights for the machine learning module 242 based on estimates. In block 702, an initial training phase of the machine learning module 242 is performed. In block 704, the machine learning module 242 is used to select one of no disconnect, logical disconnect, or physical disconnect from a channel for at least one I/O operation. In block 706, whether to retrain the machine learning module is determined. In certain embodiments, retraining occurs after completion of an I/O operation or when a pre-determined number ("N") of I/O operations complete in the storage controller 120. If so, processing continues to block 708, otherwise, processing loops back to block 704. In block 708, the machine learning module 242 is retrained, by adjusting the initial weights, to improve the determination of whether to select one of no disconnect, logical disconnect, or physical disconnect.

Figure 8A:
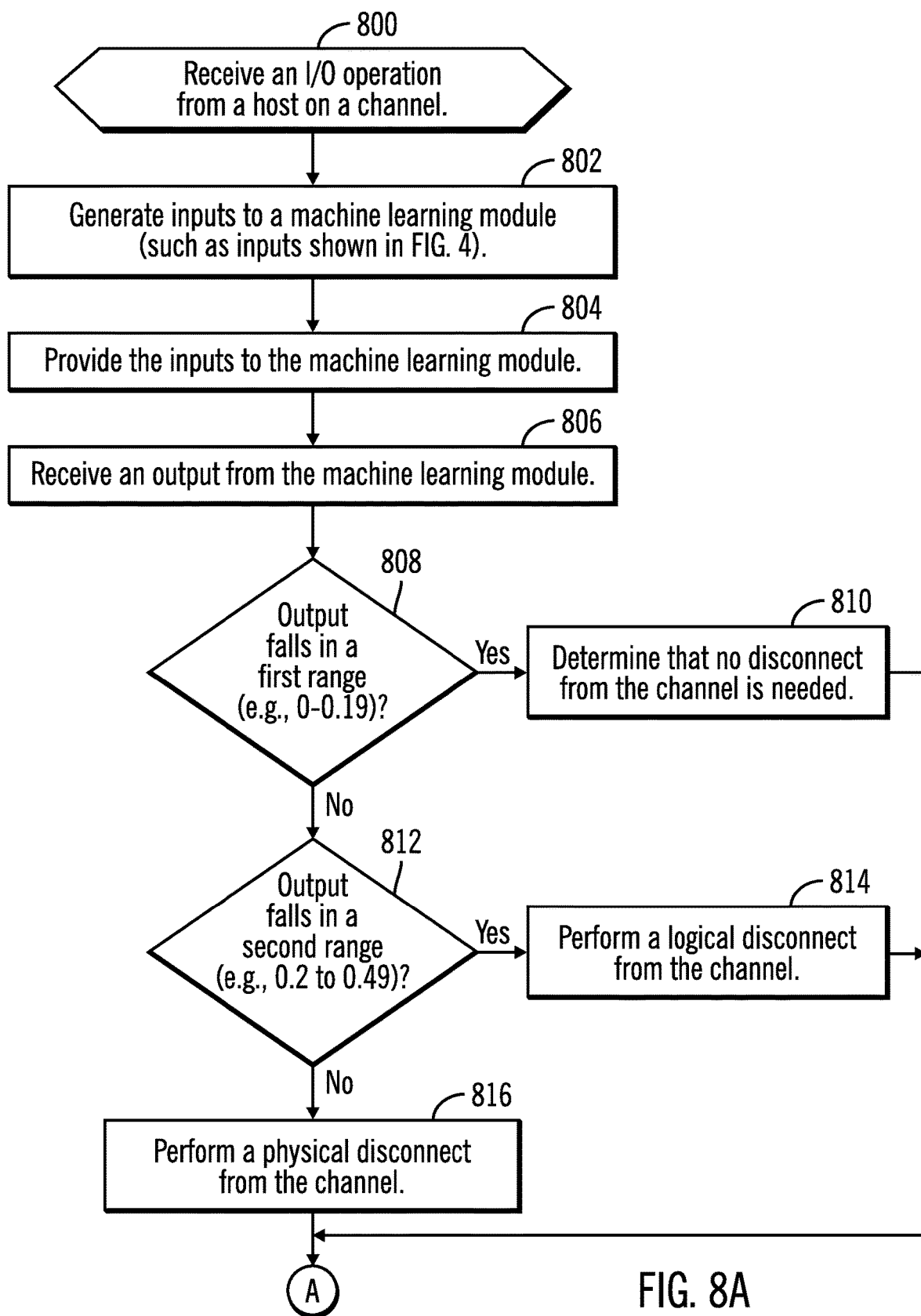
FIGS. 8A and 8B illustrate, in a flowchart, operations for processing an I/O operation in accordance with certain embodiments.
Figure 8B:
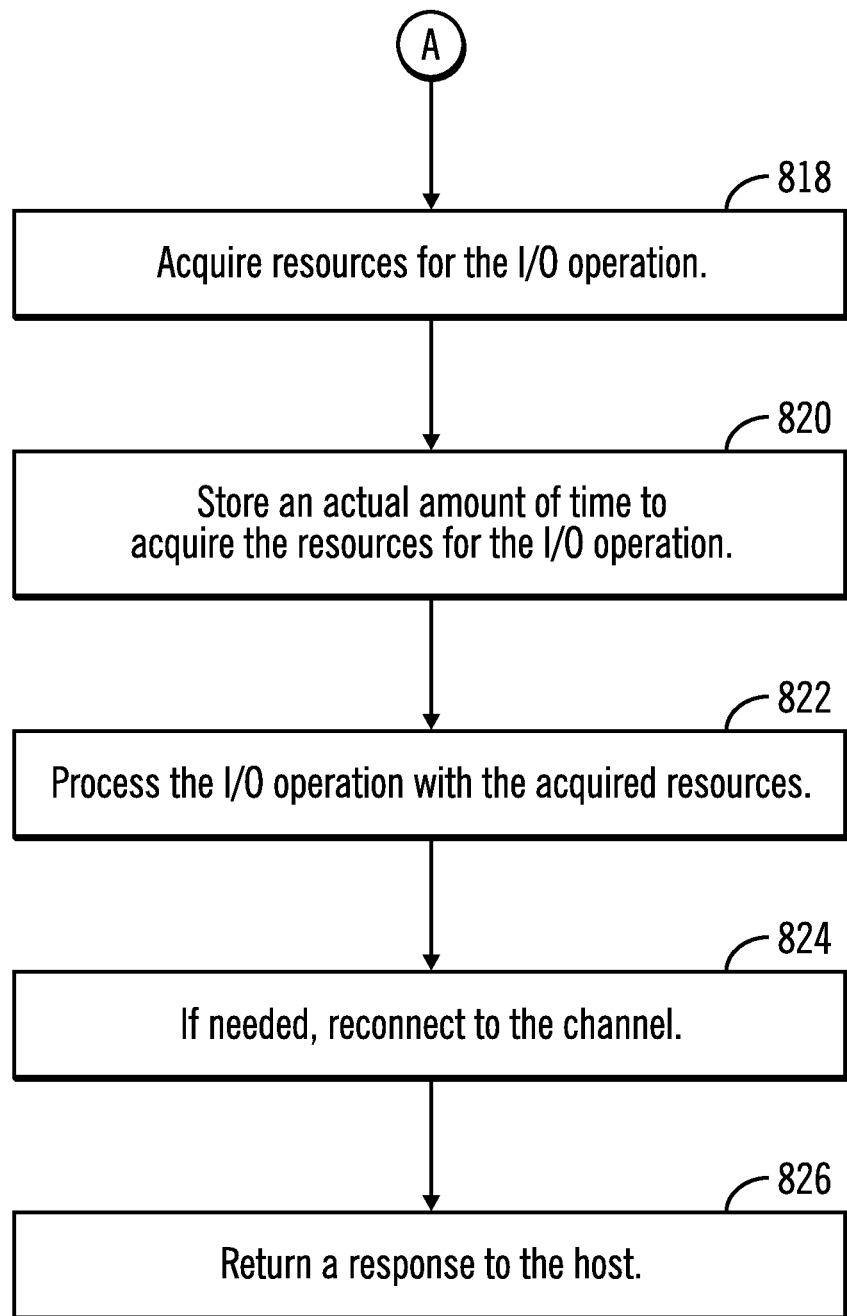

FIGS. 8A and 8B illustrate, in a flowchart, operations for processing an I/O operation in accordance with certain embodiments. Control begins at block 800 with the disconnect manager 232 receiving an I/O operation from a host on a channel. In block 802, the disconnect manager 232 generates inputs to a machine learning module (such as inputs shown in FIG. 4). In certain embodiments, the inputs are a cache wait queue length, an NVS wait queue length overall, an NVS wait queue length for that rank, a CPU utilization, a number of active tasks, a mail queue length, a number of copy relations for each of different copy relations (i.e., a number of PPRC relations, a number of XRC relations, and a number of point-in-time copy relations), type of I/O operation, copy services resource usage, and buffer usage.

In block 804, the disconnect manager 232 provides the inputs to the machine learning module 242. In block 806, the disconnect manager 232 receives an output from the machine learning module 242.

In block 808, the disconnect manager 232 determines whether the output falls in a first range (e.g., 0 to 0.19). If so, processing continues to block 810, otherwise, processing continues to block 812. In block 810, the disconnect manager 232 determines that no disconnect from the channel is needed.

In block 812, the disconnect manager 232 determines whether the output falls in a second range (e.g., 0.2 to 0.49). If so, processing continues to block 814, otherwise, processing continues to block 816. In block 814, the disconnect manager 232 performs a logical disconnect from the channel.

In block 816, the disconnect manager 232 performs a physical disconnect from the channel. If processing reaches block 816, then the output falls in a third range (e.g., 0.5 to 1). From block 816 (FIG. 8A), processing continues to block 818 (FIG. 8B).

In block 818, the storage manager 230 acquires resources for the I/O operation. In block 820, the storage manager 230 stores an actual amount of time to acquire the resources for the I/O operation. In block 822, the disconnect manager 232 processes the I/O operation with the acquired resources. In block 824, the storage manager 230, if needed, reconnects to the channel. In block 826, the storage manager 230 returns a response to the host (e.g., returns data that has been read, returns a status indicator that indicates whether the I/O operation was completed successfully, etc.).

Figure 9:
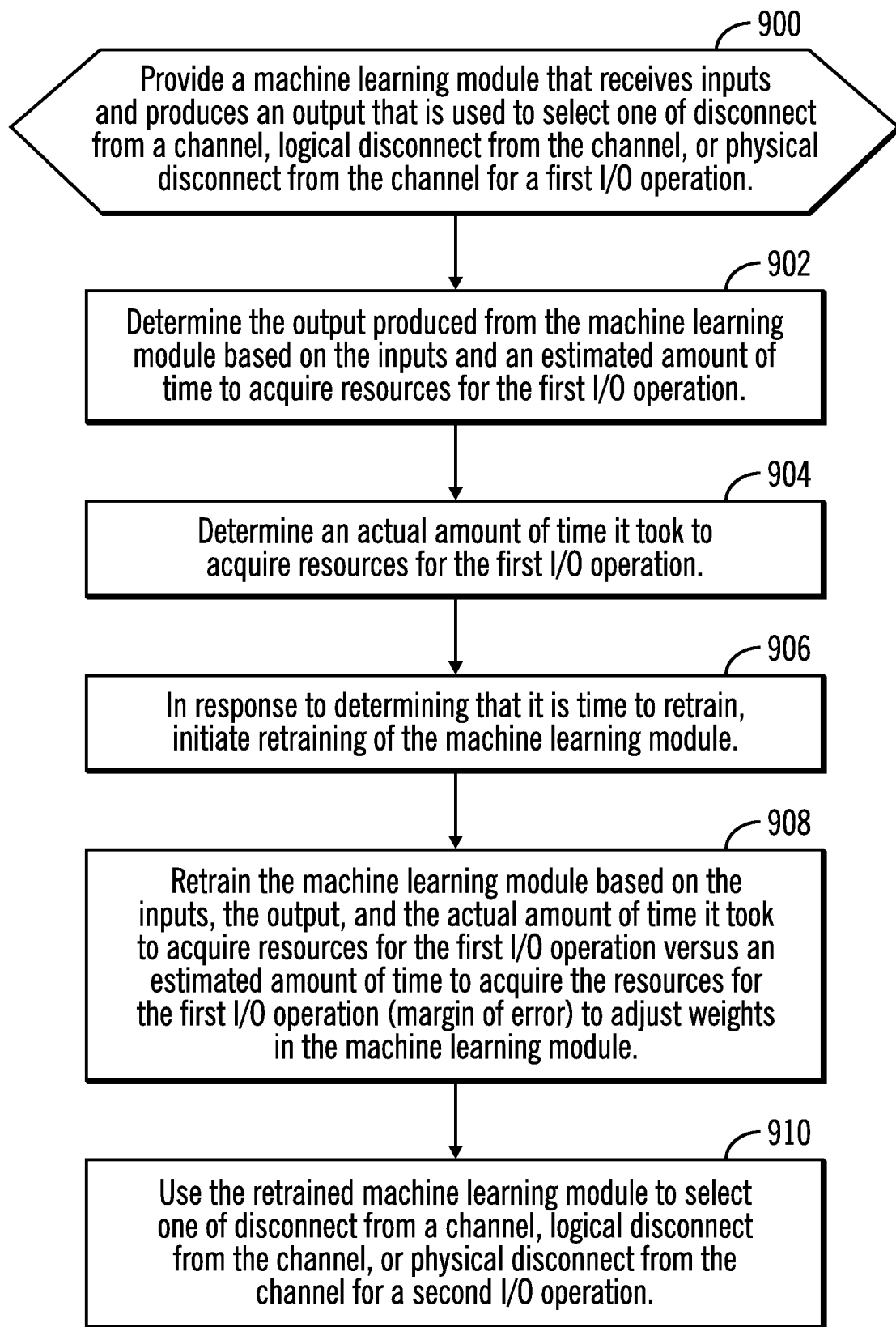
FIG. 9 illustrates, in a flowchart, operations for using a machine learning module in accordance with certain embodiments.

FIG. 9 illustrates, in a flowchart, operations for using a machine learning module in accordance with certain embodiments. Control begins at block 900 with a machine learning module 242 being provided that receives inputs and produces an output that is used to select one of disconnect from a channel, logical disconnect from the channel, or physical disconnect from the channel for a first I/O operation. In block 902, the output produced from the machine learning module based on the inputs and an estimated amount of time to acquire resources for the first I/O operation is determined. In block 904, an actual amount of time it took to acquire resources for the first I/O operation is determined. In block 906, in response to determining that it is time to retrain, retraining of the machine learning module is initiated. In certain embodiment, it is determined that it is time to retrain when the first I/O operation completes or when a pre-determined number (N) of I/O operations complete in the storage controller 120. In block 908, the machine learning module 242 is retrained based on the inputs, the output, and the actual amount of time it took to acquire resources for the first I/O operation versus an estimated amount of time to acquire the resources for the first I/O operation (margin of error) to adjust weights in the machine learning module. In block 910, the retrained machine learning module 242 is used to select one of disconnect from a channel, logical disconnect from the channel, or physical disconnect from the channel for a second I/O operation.

With embodiments, the machine learning module 242 is a neural network, which may be described as a collection of "neurons" with "synapses" connecting them. The collection is organized into three main parts: an input layer 310, one or more hidden layers 312, and an output layer 314.

With embodiments, there may be multiple hidden layers, with the term "deep" learning implying multiple hidden layers. Hidden layers may be useful when the neural network has to make sense of something complicated, contextual, or non-obvious, such as image recognition. The term "deep" learning comes from having many hidden layers. These layers are known as "hidden", since they are not visible as a network output.

Thus, with embodiments, training a neural network may be described as calibrating all of the "weights" by repeating the forward propagation 316 and the backward propagation 322.

Since neural networks are useful for regression, the best input data may be numbers (as opposed to discrete values, such as colors or movie genres, whose data is better for statistical classification models).

With embodiments, the output 324 is a number within a range (e.g., a range from 0 to 1, and this ultimately depends on the activation function).

In the forward propagation 316, embodiments apply a set of weights to the input data 318 . . . 320 and calculate an output 324.

In backward propagation 322, embodiments measure the margin of error of the output and adjust the weights accordingly to decrease the error.

Neural networks repeat both forward and backward propagation until the weights are calibrated to accurately predict the output 324.

Embodiments optimize storage controller performance by using and training neural networks to assist the storage controller 120 in determining whether to perform a logical or physical disconnection from the host 100. Embodiments use the machine learning module 242 to predict a wait time period needed for the storage controller 120 to complete its required tasks and determine whether to remain connected to the host 100 during the wait period. Embodiments use inputs 240 to estimate the amount of time needed to complete the outstanding tasks. Embodiments further measures the actual amount of time elapsed to complete the outstanding tasks, compare the actual amount of time to the estimated amount of time, and adjust the machine learning module 242.

The reference characters used herein, such as n and r are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
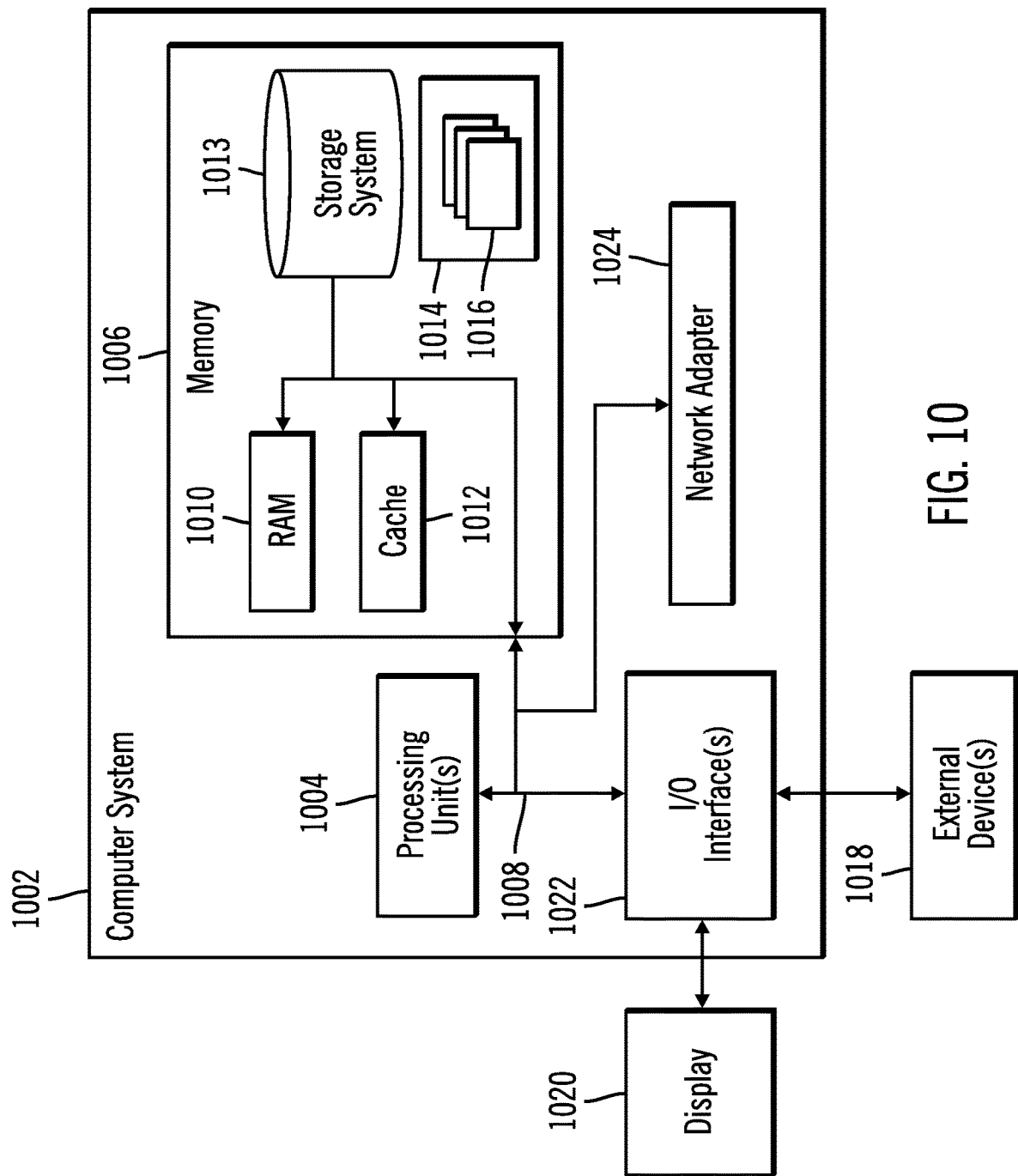
FIG. 10 illustrates a computing architecture in which the components of FIG. 1 may be implemented in accordance with certain embodiments.

FIG. 10 illustrates a computing architecture in which the components of FIG. 1 may be implemented in accordance with certain embodiments. The computational components of FIG. 1, including the host 100 and the storage controller 120 may implement computer architecture 1002. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD- ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The systems of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product, the computer program product comprising a computer readable storage medium having program code embodied therewith, the program code executable by at least one processor to perform operations, the operations comprising:
   providing a machine learning module that receives inputs and produces an output that is used to select one of no disconnect from a channel, a logical disconnect from the channel, or a physical disconnect from the channel for a first Input/Output (I/O) operation;
   determining the output produced from the machine learning module based on the inputs for the first I/O operation and an estimated amount of time to acquire resources for the first I/O operation;
   determining an actual amount of time to acquire resources for the first I/O operation;
   retraining the machine learning module based on the inputs, the output, and the actual amount of time it took to acquire resources for the first I/O operation versus the estimated amount of time to acquire the resources for the first I/O operation; and
   using the retrained machine learning module to select one of no disconnect from the channel, the logical disconnect from the channel, or the physical disconnect from the channel for a second I/O operation.

2. The computer program product of claim 1, wherein the machine learning module is retrained in response to one or more I/O operations being completed.

3. The computer program product of claim 1, wherein a margin of error is determined based on the estimated amount of time it took to acquire the resources and the actual amount of time it took to acquire resources, and wherein the margin of error is used to retrain the machine learning module.

4. The computer program product of claim 1, wherein weights are assigned to the machine learning module, and wherein the weights are adjusted when retraining the machine learning module.

5. The computer program product of claim 1, wherein the program code is executable by the at least one processor to perform:
in response to the output falling into a first range, determining that no disconnect from the channel is to be performed;
in response to the output falling into a second range, performing the logical disconnect; and
in response to the output falling into a third range, performing the physical disconnect.

6. The computer program product of claim 1, wherein the inputs comprise a cache wait queue length, a Non-Volatile Storage (NVS) wait queue length overall, an NVS wait queue length for a rank, a Central Processing Unit (CPU) utilization, a number of active tasks, a mail queue length, a number of copy relations for different copy relations, a type of I/O operation, a copy services resource usage, and a buffer usage.

7. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more computer-readable memories, to perform operations comprising:
providing a machine learning module that receives inputs and produces an output that is used to select one of no disconnect from a channel, a logical disconnect from the channel, or a physical disconnect from the channel for a first Input/Output (I/O) operation;
determining the output produced from the machine learning module based on the inputs for the first I/O operation and an estimated amount of time to acquire resources for the first I/O operation;
determining an actual amount of time to acquire resources for the first I/O operation;
retraining the machine learning module based on the inputs, the output, and the actual amount of time it took to acquire resources for the first I/O operation versus the estimated amount of time to acquire the resources for the first I/O operation; and
using the retrained machine learning module to select one of no disconnect from the channel, the logical disconnect from the channel, or the physical disconnect from the channel for a second I/O operation.

8. The computer system of claim 7, wherein the machine learning module is retrained in response to one or more I/O operations being completed.

9. The computer system of claim 7, wherein a margin of error is determined based on the estimated amount of time it took to acquire the resources and the actual amount of time it took to acquire resources, and wherein the margin of error is used to retrain the machine learning module.

10. The computer system of claim 7, wherein weights are assigned to the machine learning module, and wherein the weights are adjusted when retraining the machine learning module.

11. The computer system of claim 7, wherein the operations further comprise:
in response to the output falling into a first range, determining that no disconnect from the channel is to be performed;
in response to the output falling into a second range, performing the logical disconnect; and
in response to the output falling into a third range, performing the physical disconnect.

12. The computer system of claim 7, wherein the inputs comprise a cache wait queue length, a Non-Volatile Storage (NVS) wait queue length overall, an NVS wait queue length for a rank, a Central Processing Unit (CPU) utilization, a number of active tasks, a mail queue length, a number of copy relations for different copy relations, a type of I/O operation, a copy services resource usage, and a buffer usage.

13. A computer-implemented method, comprising:
providing a machine learning module that receives inputs and produces an output that is used to select one of no disconnect from a channel, a logical disconnect from the channel, or a physical disconnect from the channel for a first Input/Output (I/O) operation;
determining the output produced from the machine learning module based on the inputs for the first I/O operation and an estimated amount of time to acquire resources for the first I/O operation;
determining an actual amount of time to acquire resources for the first I/O operation;
retraining the machine learning module based on the inputs, the output, and the actual amount of time it took to acquire resources for the first I/O operation versus the estimated amount of time to acquire the resources for the first I/O operation; and
using the retrained machine learning module to select one of no disconnect from the channel, the logical disconnect from the channel, or the physical disconnect from the channel for a second I/O operation.

14. The computer-implemented method of claim 13, wherein the machine learning module is retrained in response to one or more I/O operations being completed.

15. The computer-implemented method of claim 13, wherein a margin of error is determined based on the estimated amount of time it took to acquire the resources and the actual amount of time it took to acquire resources, and wherein the margin of error is used to retrain the machine learning module.

16. The computer-implemented method of claim 13, wherein weights are assigned to the machine learning module, and wherein the weights are adjusted when retraining the machine learning module.

17. The computer-implemented method of claim 13, further comprising:
in response to the output falling into a first range, determining that no disconnect from the channel is to be performed;
in response to the output falling into a second range, performing the logical disconnect; and
in response to the output falling into a third range, performing the physical disconnect.

18. The computer-implemented method of claim 13, wherein the inputs comprise a cache wait queue length, a Non-Volatile Storage (NVS) wait queue length overall, an NVS wait queue length for a rank, a Central Processing Unit (CPU) utilization, a number of active tasks, a mail queue length, a number of copy relations for different copy relations, a type of I/O operation, a copy services resource usage, and a buffer usage.

* * * * *